Nov. 15, 1960     A. L. FLATAU     2,960,366
BALE LIFTER
Filed March 25, 1957

INVENTOR.
Alfred L. Flatau
BY

United States Patent Office

2,960,366
Patented Nov. 15, 1960

2,960,366

BALE LIFTER

Alfred L. Flatau, Rte. 9, Box 119, Olympia, Wash.

Filed Mar. 25, 1957, Ser. No. 648,330

2 Claims. (Cl. 294—74)

This invention relates to hoisting and elevating equipment particularly as used for handling bales of hay and the like, and in particular a rigid frame including a pair of spaced parallel bars, one being shorter than the other, with chains releasably connected to ends of the short bar and secured by snap fasteners to the upper end of a vertically disposed supporting structure whereby bales retained on the bars by the chains may be elevated by a hoist or the like to the upper portion of a mow in a barn and released by a trip rope or cable extended from latches connecting the chains to the ends of the short bar to an operator on the floor or ground.

The purpose of this invention is to provide a bale lifter which is so constructed that bales, such as bales of hay, may be elevated by a rigid frame and readily released from the frame by pulling on a trip rope or the like from a floor or from the ground below.

In the conventional method of transferring bales of hay from a wagon, or truck to a barn, the bales are carried by a sling, or secured on a platform by flexible elements, and with the bales elevated to high positions in large barns it is difficult to release the holding elements. Furthermore, where the slings are formed with ropes the weight of the bales on the ropes makes it difficult to draw the ropes from the bales.

With this thought in mind this invention contemplates a bale carrying frame having a vertically disposed center structure with parallel horizontally positioned bars extended from the lower end and with chains or other flexible elements connected by snap fasteners and latches to the ends of one of the bars and to the upper portion of the center structure in which the length of one of the bars is less than that of the other whereby upon releasing the flexible holding elements bales positioned on the bars are unbalanced and readily drop from the frame.

The object of this invention is, therefore, to provide a bale carrying frame in which, upon the release of flexible holding elements, parts of the supporting structure drop away permitting the bales to tilt and fall from the frame.

Another object of the invention is to provide a bale lifting frame in which bales are retained on the frame by flexible elements in which all bales on the frame readily drop from the device upon release of the flexible holding elements.

Another important object of the invention is to provide a bale lifting frame having flexible elements for retaining bales on a rigid structure in which, upon release of the bales, the flexible elements drop free of the bales and it is not necessary to move the bales to release the flexible elements.

It is yet another object of the invention to provide means for constructing a bale carrying frame whereby upon release of bale holding elements of the frame all bales on the frame drop instantly therefrom so that the frame may be taken immediately to a wagon or truck for reloading bales thereon.

A further object of the invention is to provide a bale lifter that is readily attached to a hook of a crane or hoist so that it may readily be conveyed from one point to another.

A still further object of the invention is to provide a frame for carrying bales of hay and the like in which the frame is of rugged construction and is of simple and economical construction.

With these and other objects and advantages in view the invention embodies a vertically disposed center structure including four posts connected by cross members, spaced parallel rods secured to ends of cross members connecting lower ends of the posts, one of said rods being shorter than the other, flexible elements extended from ends of the short rod, latches connecting the flexible elements to the ends of the short rod, snap fasteners connecting the opposite ends of the flexible elements to upper ends of the posts, and a trip rope extended from the latches at the ends of the short rod to a point on the ground or floor for actuating the latches to release the flexible elements and bales on the rods.

Other features and advantages of the invention will appear from the following description taken in connection with the drawings, wherein.

Figure 4:
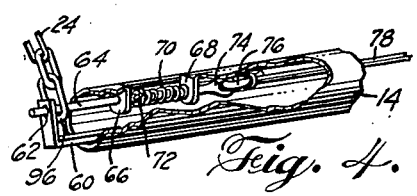
Figure 4 is a view showing a latch assembly for connecting chains to ends of the short bar, part of the bar being broken away and the parts being shown on an enlarged scale.

While one embodiment of the invention is illustrated in the above-referred-to-drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity in which it may be found applicable.

In the accompanying drawings and in the following specification, the same reference characters are used to designate the same parts and elements throughout, and in which the numeral 10 refers to the invention in its entirety, numeral 12 indicating a long horizontally disposed bar, numeral 14 a short bar, numerals 16 and 18 posts positioned on the side of the frame on which the long bar is positioned, numerals 20 and 22 posts positioned on the side of the frame on which the short bar is located, and numerals 24 and 26 flexible elements, such as chains, extended from ends of the short bar.

Figure 1:
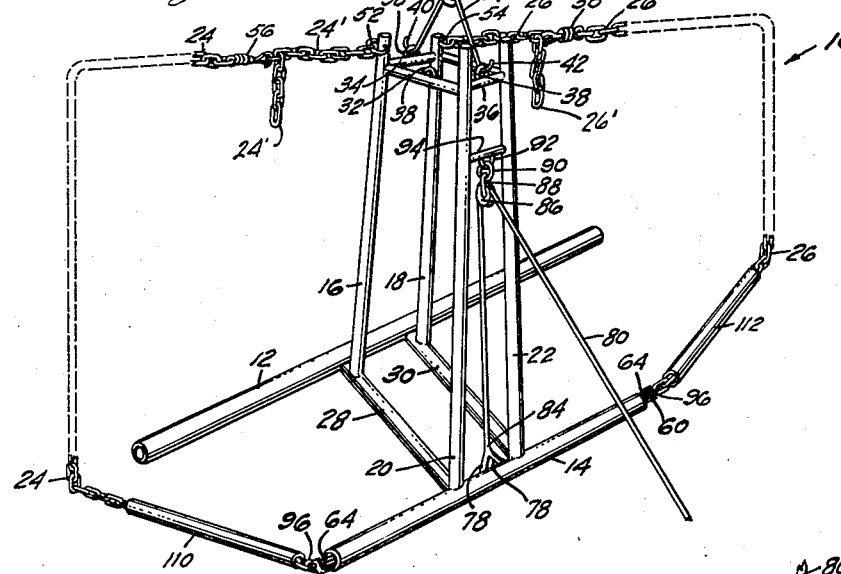
Figure 1 is a perspective view illustrating the construction and relative positions of the parts of the improved bale lifting frame.

The posts 16 and 20 extend upwardly from a strut 28 extended between the bars 12 and 14, and the posts 18 and 22 extend from a similar strut 30. The upper ends of the posts 16 and 20 are connected by a brace 32 and a similar brace connects the upper ends of the posts 18 and 22. Similar braces 34 and 36 connect upper ends of the posts 16 and 18, and 20 and 22, respectively. Each of the braces connecting the upper ends of the posts is provided with an eye 38, and, as shown in Figure 1, hooks 40 and 42 on the ends of a V-shaped bar 44 extend through the eyes of the braces 34 and 36. The vertex of the bar 44 is positioned over a hook 46 depending from a pulley block 48 suspended by cables 50.

The upper ends of the posts 16 and 18 are provided with rings 52 and 54 to which are secured substantial lengths of chain 24' and 26'. Swivel snap-hooks 56 and 58 attached to the upper ends of the chains 24 and 26 and are positioned to be adjustably engaged in a desired one of the links of the shorter chains 24' and 26' attached to the posts 16 and 18.

As illustrated in Figure 1, the upper ends of the posts 16 and 18 at one side of the frame and also of the posts 20 and 22 at the opposite side are closer together than the lower ends whereby superimposed bales of hay are closer together at the center of the frame than the bales below, thereby facilitating retaining bales of hay on the lifter, it being appreciated that retaining bales of hay on a frame suspended by a cable at a single point is difficult.

The lower horizontally disposed bars 12 and 14 are tubular to reduce weight, and as shown in Figure 4, the ends of the short bar 14 are provided with stationary L-shaped arms 60, upwardly extended ends of which are provided with openings 62, and latch bolts 64 which are slidably mounted in tangs 66 and 68 are urged into the openings 62 of the arms with springs 70 that are positioned between the tangs 68 and pins 72 that extend through the latch bolts. The inner ends of the latch bolts are formed with eyes 74 in which loops 76 at the ends of ends 78 of a trip cord 80 are positioned. The trip or pull cord 82 is divided at the point 84, and from the point 84 the cord extends upwardly to a sheave 86 in a block 88 suspended by a link 90 from an eye 92 on a cross bar 94 extended between the posts 20 and 22.

The ends of the latch bolts 64 extend through end links 96 of the chains and by pulling on the trip cord 80 the bolts are drawn from the links so that the chains are released.

Figure 3:
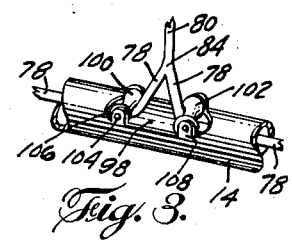
Figure 3 is a view showing the center portion of a short bar or rod of a bale carrying frame illustrating the method of threading ends of a trip cord through the bar, with ends of the bar broken away and with the parts shown on an enlarged scale.

The ends 78 of the trip cord extend from the point 84 into an opening 98 in the short bar 14 and to prevent wearing of the cord by sliding over edges of the wall of the bar rollers 100 and 102 are provided on the bar, as shown in Figure 3. The roller 100 is rotatably mounted by a pin 104 in tangs 106 extended upwardly from the bar, and the roller 102 is rotatably mounted in similar tangs 108.

Portions of the chains 24 and 26, adjacent the ends of the short bar are covered with flexible tubes, such as garden hose 110 and 112, so as to stiffen these portions of the chains to facilitate handling and positioning the chains.

*Operation*

Figure 2:
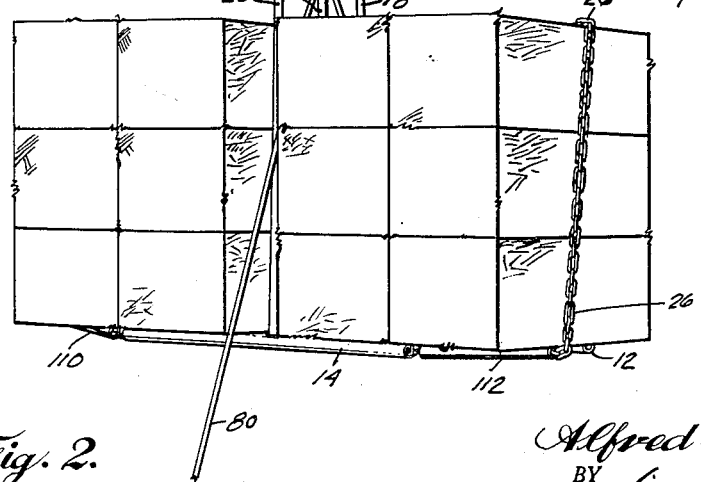
Figure 2 is a view showing the device with a plurality of bales positioned thereon.

The bale lifter is in the loading position with the chains extended whereby the lower ends are secured in the latches at the ends of the short bar 14, and with the snap fasteners at the upper ends released from the rings at the upper ends of the posts 16 and 20. Bales, such as bales of hay, are positioned transversely on the bars 12 and 14 and the chains are drawn over the bales at the ends, as shown in Figure 2. The snap fasteners are secured in the rings 52 and 54 at the upper ends of the posts and with the bar 44 on the hook 46 the frame, with the bales thereon, is elevated by a hoist or the like, and conveyed to an upper position in a mow of a barn or the like.

With the bale lifter in the desired position the trip cord 80 is pulled whereby the latches release the ends of the chains at the ends of the short bar so that with the supporting means dropped away at one side the bales are unbalanced and will immediately drop downwardly into desired positions. The frame is free to return for another load as soon as the bales drop therefrom and in the return movement the chains hang from the rings at the upper ends of the posts.

The frame is supported by a cable and as the bales are released a falling bale kicks the frame first from one side and then the frame is kicked from the opposite side by another falling bale whereby all bales carried by the frame are dropped therefrom.

From the foregoing specification, it will become apparent that the invention disclosed will adequately accomplish the functions for which it has been designed and in an economical manner and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. In a bale lifter, the combination which comprises pairs of posts positioned in spaced vertically disposed planes, horizontally positioned bars positioned in the planes in which the pairs of posts are positioned and connected to lower ends of the posts, one of said bars being longer than the other and midway points of the bars being located midway between lower ends of the pairs of posts, struts extended transversely of a frame formed by the posts and bars and connecting lower ends of the posts of the pairs, horizontally disposed braces connecting upper ends of the posts, chains extended from ends of the short bar and being of sufficient length to extend around bales of hay on the frame and to upper ends of posts of the pairs of posts, sleeves of flexible material positioned on portions of the chains adjacent ends of the short bar, latches mounted in ends of the short bar for temporarily retaining ends of the chains in the ends of the bar, a pulley suspended between the pair of posts on the side of the frame on which the short bar is positioned, a cable trained over said pulley and having a divided end with sections thereof extended through the end portions of the short bar and connected to the latches, said pulley being positioned on the upper part and on one side of the frame whereby pull on the cable tilts the frame, and a V-shaped cable attaching bar connected to braces between upper ends of the pairs of posts.

2. A bale lifter as described in claim 1, wherein upper ends of the posts of the pairs are closer together than the lower ends whereby superimposd bales of hay positioned in contact with the posts are closer to the center of gravity of the frame facilitating retaining the bales on the frame until the bales are released.

References Cited in the file of this patent
UNITED STATES PATENTS

| 146,436 | Dilley | Jan. 13, 1874 |
| 579,642 | Fell | Mar. 30, 1897 |
| 1,198,139 | Lyon | Sept. 12, 1916 |

FOREIGN PATENTS

| 25,486 | Finland | June 26, 1952 |